（12） United States Patent
Benyassine et al.

(10) Patent No.: US 7,539,300 B1
(45) Date of Patent: May 26, 2009

(54) ECHO CANCELLER WITH ENHANCED INFINITE AND FINITE ERL DETECTION

(75) Inventors: Adil Benyassine, Irvine, CA (US); Nick J. Lavrov, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 774 days.

(21) Appl. No.: 11/150,696

(22) Filed: Jun. 11, 2005

(51) Int. Cl.
*H04M 9/08* (2006.01)

(52) U.S. Cl. .................................. 379/406.04

(58) Field of Classification Search ............. 379/406.04
See application file for complete search history.

(56) References Cited

U.S. PATENT DOCUMENTS 6,980,528 B1 * 12/2005 LeBlanc et al. ............. 370/290

* cited by examiner

*Primary Examiner*—Alexander Jamal
(74) *Attorney, Agent, or Firm*—Farjami & Farjami LLP

(57) ABSTRACT

There is provided a method of detecting an infinite echo return loss (ERL) in an echo cancellation system while in a finite ERL mode. The method comprises determining a running mean attenuation by the echo cancellation system, determining a ratio of an echo signal to a near-end noise ratio (ENR), defining an infinite ERL threshold ($TH_{infinite}$) as a function of the ENR, and switching to an infinite ERL mode as a function of the running mean attenuation and the $TH_{infinite}$. The running mean attenuation can be enhanced echo return loss (ERLE), and the higher the ENR the higher the $TH_{infinite}$ and the lower the ENR the lower the $TH_{infinite}$. The switching can further be a function of an energy distribution, where the switching switches to the infinite ERL mode based on a non-localized energy distribution over an echo path delay for a predetermined period of time.

16 Claims, 4 Drawing Sheets

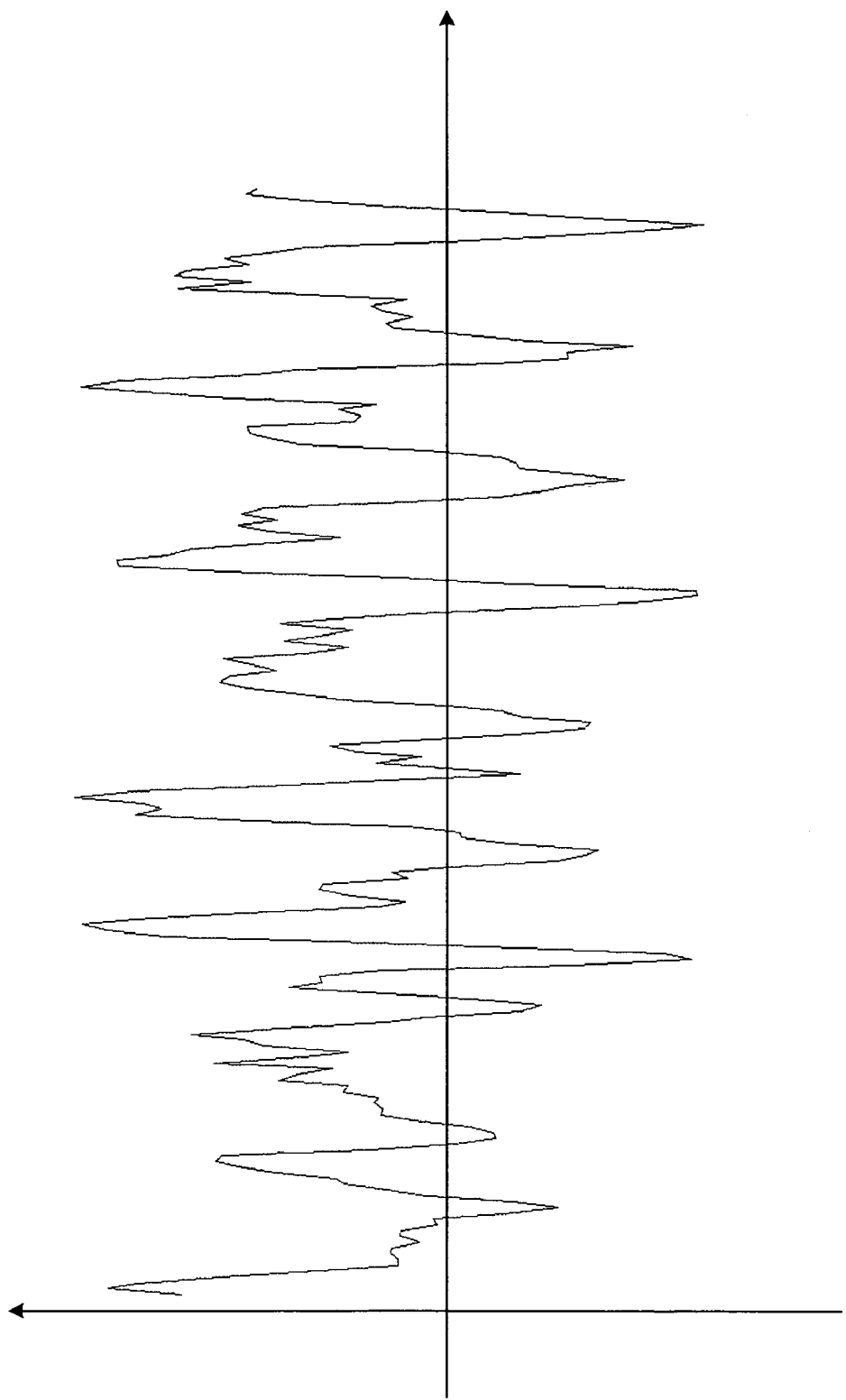

ECHO CANCELLER WITH ENHANCED INFINITE AND FINITE ERL DETECTION

BACKGROUND OF THE INVENTION

1. Field of the Invention

The present invention relates generally to echo canceller systems in communication networks. More particularly, the present invention relates to methods and systems for detection of infinite and finite echo return loss (ERL).

2. Background Art

Subscribers use speech quality as the benchmark for assessing the overall quality of a telephone network. A key technology to provide a high quality speech is echo cancellation. Echo canceller performance in a telephone network, either a TDM or packet telephony network, has a substantial impact on the overall voice quality. An effective removal of hybrid and acoustic echo inherent in telephone networks is a key to maintaining and improving perceived voice quality during a call.

Echoes occur in telephone networks due to impedance mismatches of network elements and acoustical coupling within telephone handsets. Hybrid echo is the primary source of echo generated from the public-switched telephone network (PSTN). As shown in FIG. 1, hybrid echo 110 is created by a hybrid, which converts a four-wire physical interface into a two-wire physical interface. The hybrid reflects electrical energy back to the speaker from the four-wire physical interface. Acoustic echo, on the other hand, is generated by analog and digital telephones, with the degree of echo related to the type and quality of such telephones. As shown in FIG. 1, acoustic echo 120 is created by a voice coupling between the earpiece and microphone in the telephones, where sound from the speaker is picked by the microphone, for example, by bouncing off the walls, windows, and the like. The result of this reflection is the creation of multi-path echo, which would be heard by the speaker unless eliminated.

As shown in FIG. 1, in modern telephone networks, echo canceller 140 is typically positioned between hybrid 130 and network 150. Generally speaking, echo cancellation process involves two steps. First, as the call is set up, echo canceller 140 employs a digital adaptive filter to adapt to the far-end signal and create a model based on the far-end signal before passing through hybrid 130. After the near-end signal including the echo signal, passes through hybrid 130, echo canceller 140 subtracts the far-end model from the near-end signal to cancel hybrid echo and generate an error signal. Although this echo cancellation process removes a substantial amount of the echo, non-linear components of the echo may still remain. To cancel non-linear components of the echo, the second step of the echo cancellation process utilizes a non-linear processor (NLP) to eliminate the remaining or residual echo by attenuating the signal below the noise floor.

However, digital connections do not include a hybrid that converts a four-wire physical interface into a two-wire physical interface, rather in digital connections a four-wire physical interface is converted into another four-wire physical interface and, thus, digital connections do not cause impedance mismatches that give rise to an echo. For this reason, digital connections are referred to as zero echo path or infinite ERL. When infinite ERL is detected, the correct model of echo is zero, i.e. the near-end signal should pass through without any subtraction of echo signal from the near-end signal. If existence of a digital connection or infinite ERL is not properly and timely detected by an echo cancellation system, the adaptive filter of the echo cancellation system may train on noise from the near-end or a leakage of the near-end talker signal, which can leak due to untimely detection of double talk. As a result, the adaptive filter generates an echo model based on the near-end signal and not the far-end signal. As described above, the echo cancellation system subtracts the echo model from the near-end signal, which does not include any echo, since there is an infinite ERL. As a result, the echo cancellation system becomes an echo generator, rather than an echo canceller.

Furthermore, if an infinite ERL is not timely and properly detected, the NLP may falsely engage, and cause signal choppiness in the near-end signal. For this reason, the infinite ERL must be properly and timely detected, such that the NLP is bypassed.

During a given connection, the echo path may also change, and a digital connection may be changed to a connection having a hybrid, which converts a four-wire physical interface into a two-wire physical interface and, thus, giving rise to an echo signal. Untimely detection of a finite ERL will, of course, prevent the adaptive filter to generate an echo model for subtraction from the near-end signal, and echo signals will not be cancelled and will be heard by the far-end talker.

Accordingly, there is a need in the art for timely and proper detection of infinite ERL and finite ERL to timely disable and enable echo cancellation, respectively.

SUMMARY OF THE INVENTION

The present invention is directed to methods and systems for detection of infinite ERL and finite ERL to timely disable and enable echo cancellation, respectively. According to one aspect of the present invention, there is provided a method of detecting an infinite echo return loss (ERL) in an echo cancellation system while in a finite ERL mode. The method comprises determining a running mean attenuation by the echo cancellation system, determining a ratio of an echo signal to a near-end noise ratio (ENR), defining an infinite ERL threshold ($TH_{infinite}$) as a function of the ENR, switching to an infinite ERL mode as a function of the running mean attenuation and the $TH_{infinite}$. The running mean attenuation can be enhanced echo return loss (ERLE), where the higher the ENR the higher the $TH_{infinite}$ and the lower the ENR the lower the $TH_{infinite}$, and where the switching occurs if the running mean attenuation is less than the $TH_{infinite}$, and the switching includes disabling echo cancellation by the echo cancellation system. In one aspect, disabling echo cancellation includes bypassing an adaptive filter and a non-linear processor (NLP) of the echo cancellation system.

In a separate aspect, the switching is further a function of an energy distribution, where the switching switches to the infinite ERL mode based on a non-localized energy distribution over an echo path delay for a predetermined period of time.

In a further aspect, the method further comprises detecting a finite ERL while in the infinite ERL mode, which includes determining the running mean attenuation by the echo cancellation system, determining the ratio of the echo signal to a near-end noise ratio (ENR), defining a finite ERL threshold ($TH_{finite}$) as a function of the ENR, and switching to the finite ERL mode as a function of the running mean attenuation and the $TH_{finite}$.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3B illustrates a signal diagram of energy distribution for the infinite ERL.

DETAILED DESCRIPTION OF THE INVENTION

Figure 1:
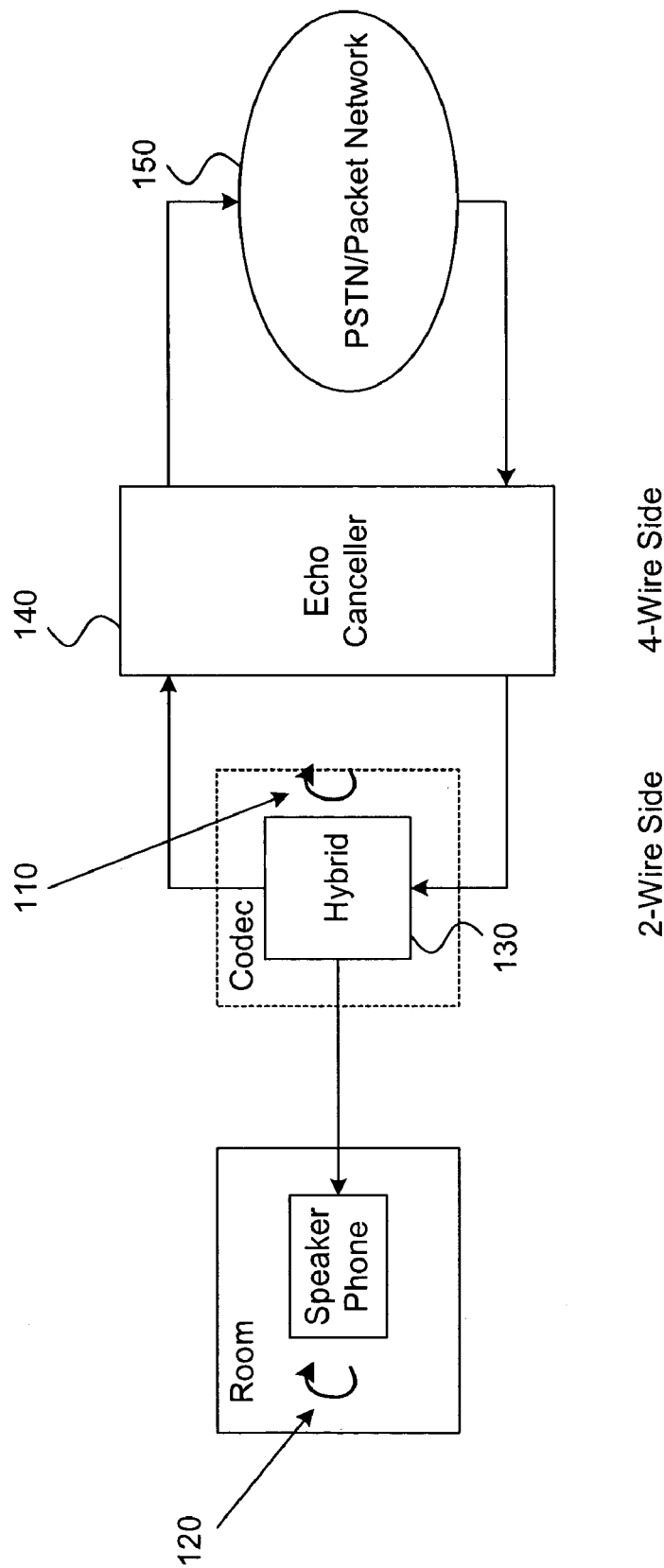
FIG. 1 illustrates a block diagram of a conventional communication system showing a placement of an echo canceller in an access network.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
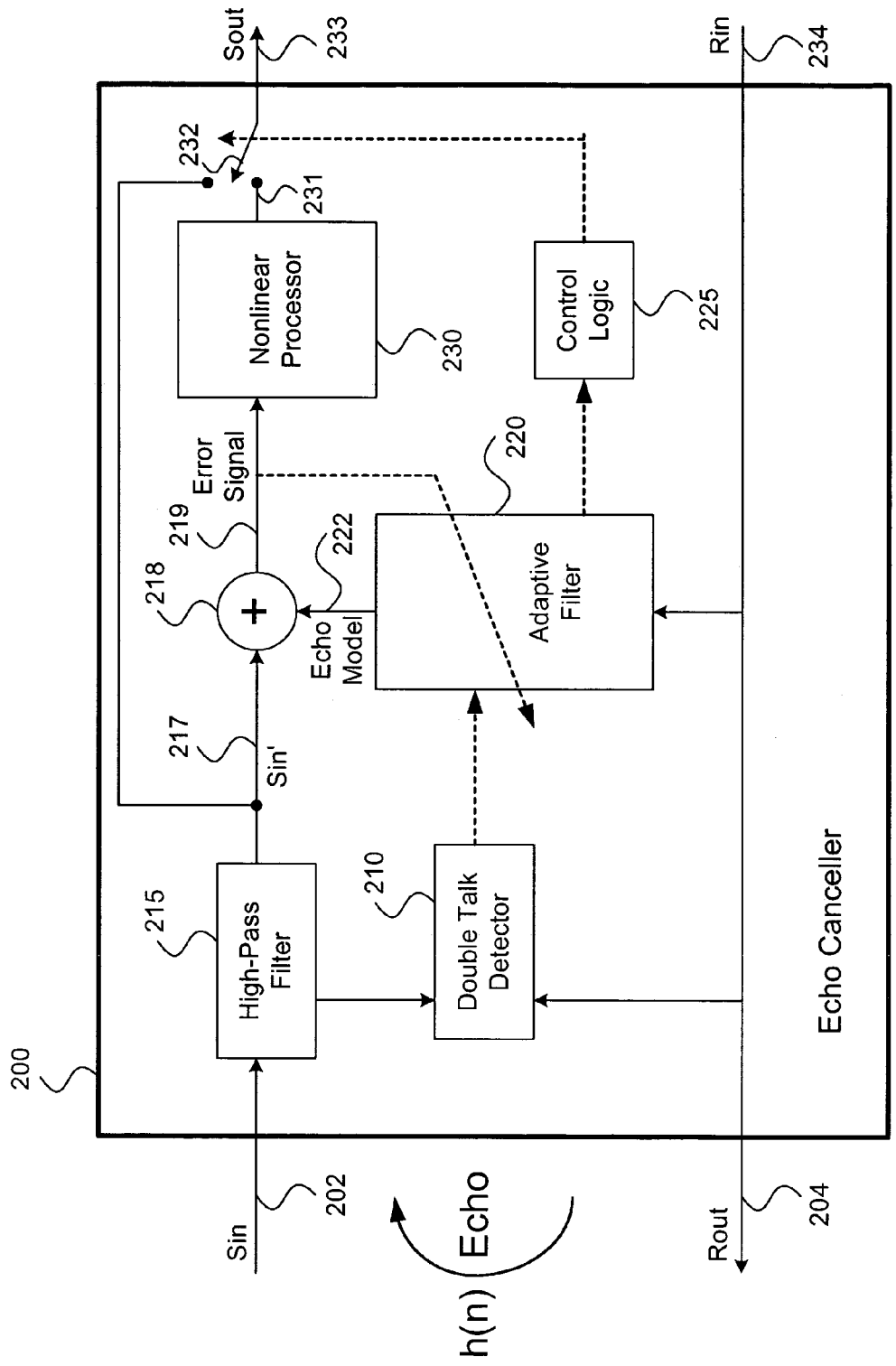
FIG. 2 illustrates a block diagram of an echo canceller, according to one embodiment of the present invention.

FIG. 2 illustrates a block diagram of echo canceller 200, according to one embodiment of the present invention. As shown, echo canceller 200 includes double talk detector 210, high-pass filter 215, adaptive filter 220, control logic 225 and nonlinear processor 230. During its operation, echo canceller 200 receives Rin signal 234 from the far end, which is fed to adaptive filter 220 and double talk detector 210, and is passed through to the hybrid, e.g. see hybrid 130 of FIG. 1, as Rout signal 204 to the near end. As discussed above, the hybrid causes Rout signal 204 to be reflected as Sin signal 202 from the near end, which is fed to high pass filter 215 and double talk detector 210. In case of a digital connection or infinite ERL, no hybrid exists and, thus, no reflection of Rout signal occurs.

High-pass filter 215, which is placed at the near-end side of echo canceller 200, removes DC component from Sin signal 202 and generates Sin' signal 217. Double talk detector 210 controls the behavior of adaptive filter 220 during periods when Sin signal 202 from the near end reaches a certain level. Because echo canceller 200 is utilized to cancel an echo of Rin signal 234 from the far end, presence of speech signal from the near end would cause adaptive filter 220 to converge on a combination of near end speech signal and Rin signal 234, which will lead to an inaccurate echo path model, i.e. incorrect adaptive filter 220 coefficients. Therefore, in order to cancel the echo signal, adaptive filter 220 should not train in the presence of the near end speech signal. To this end, echo canceller 200 must analyze the incoming signal and determine whether it is solely an echo signal of Rin signal 234 or also contains the speech of a near end talker. By convention, if two people are talking over a communication network or system, one person is referred to as the "near talker," while the other person is referred to as the "far talker." The combination of speech signals from the near end talker and the far end talker is referred to as "double talk." To determine whether Sin signal 202 contains double talk, double talk detector 210 estimates and compares the characteristics of Rin signal 234 and Sin signal 202. A primary purpose of double talk detector is to prevent adaptive filter 220 from adaptation when double talk is detected or to adjust the degree of adaptation based on confidence level of double talk detection.

Echo canceller 200 utilizes adaptive filter 220 to model the echo path and its delay. In one embodiment, adaptive filter 220 uses a transversal filter with adjustable taps, where each tap receives a coefficient that specifies the magnitude of the corresponding output signal sample and each tap is spaced a sample time apart. The better the echo canceller can estimate what the echo signal will look like, the better it can eliminate the echo. To improve performance of echo canceller 200, it may be desirable to vary the adaptation rate at which the transversal filter tap coefficients of adaptive filter 220 are adjusted. For instance, if double talk detector 210 denotes a high confidence level that the incoming signal is an echo signal, it is preferable for adaptive filter 220 to adapt quickly. On the other hand, if double talk detector 210 denotes a low confidence level that the incoming signal is an echo signal, i.e. it may include double talk, it is preferable to decline to adapt at all or to adapt very slowly. If there is an error in determining whether Sin signal 202 is an echo signal, a fast adaptation of adaptive filter 220 causes rapid divergence and a failure to eliminate the echo signal.

In one embodiment, adaptive filter 220 may be represented by function h(n), which is originally reset, i.e. h(n)=0. As Rin signal 234 is received by adaptive filter 220, function h(n) grows to form an echo path model based on Rin signal 234 from the far end. In one embodiment, echo canceller 200 can be a SPARSE echo canceller, which employs adaptive filter algorithms with a dynamically positioned window to cover a desired echo tail length. In such embodiment, echo canceller 200 uses a sliding window, e.g. a 24 ms window, covering an echo path delay, e.g. a 128 ms delay. To properly cancel the echo, echo canceller 200 must determine pure delay or bulk delay, which is indicative of the location of the echo signal segment or window within the 128 ms echo path delay. A bulk delay parameter stores the location of bulk delay, which is determined by echo canceller 200 based on an analysis of the echo path delay. In another embodiment, echo canceller 200 can be a non-SPARSE echo canceller, which applies a full-length adaptive filter to cover a specific echo tail length. In such embodiment, echo canceller 200 uses full-window adaptive filter algorithms to cover the echo path delay, e.g. a 24 ms delay.

As shown in FIG. 2, adaptive filter 220 produces echo model signal 222 based on Rin signal 234 from the far end. Error estimator 218 receives Sin' signal 217, which is the output of high-pass filter 215, and subtracts echo model signal 222 from Sin' signal 217 to generate residual echo signal or error signal 219. Adaptive filter 220 also receives error signal 219 and updates its coefficients based on error signal 219.

It is known that the echo path includes nonlinear components that cannot be removed by adaptive filter 220 and, thus, after subtraction of echo model signal 222 from Sin' signal 217, there remains residual echo, which must be eliminated by nonlinear processor (NLP) 230. As shown NLP 230 receives residual echo signal or error signal 219 from error estimator 218 and generates Sout 233 for transmission to far end. If error signal 219 is below a certain level, NLP 230 replaces the residual echo with either comfort noise if the comfort noise option is enabled, or with silence if the comfort noise option is disabled.

With continued reference to FIG. 2, echo canceller 200 includes control logic 225, which is utilized by echo canceller 200 to detect infinite ERL for disabling echo cancellation and to detect finite ERL to enable echo cancellation. As shown in FIG. 2, in one embodiment, echo cancellation is disabled by controlling switch 232 to connect Sout 233 to Sin' signal 217, and echo cancellation is enabled by controlling switch 232 to connect Sout 233 to NLP output signal 231. In one embodiment of the present invention, control logic 225 detects the infinite ERL based on the performance of echo canceller 200, which is measured by determining the amount of echo signal that has been attenuated by echo canceller 200 over a predetermined time. ERL is measured in dB and is the ratio of Rout signal 204 and Sin signal 202 power. ERL measures Rout signal 204 loss when Rout signal 204 is reflected back as echo within Sin signal 202. The infinite ERL indicates digital termination or on-hook condition.

In conventional echo cancellation system, if it is determined that after the predetermined period of time, the echo cancellation system has not performed any attenuation, the echo cancellation is disabled and Sin signal is permitted to pass to the far end without subtraction of an echo signal. However, this conventional approach fails to detect infinite ERL in many circumstances. For example, due to some correlation between Rin signal 234 and Sin signal 202 or near-end noisy environment, conventional adaptive filters can falsely indicate that there is filter contribution or attenuation of the signal, when there is no significant filter contribution or attenuation of the signal. As a result, the infinite ERL is not detected and echo cancellation remains enabled when there is no echo in the network, and as described above, the echo cancellation system itself becomes a source of echo.

According to one embodiment of the present invention, control logic 225 determines the signal-to-noise ratio (SNR) or echo signal to near-end noise ratio (ENR), based on Rout signal 204 and Sin signal 202. Further, control logic 225 determines the running mean attenuation or echo return loss enhancement (ERLE), which is measured in dB. The ERLE or running mean attenuation is the ratio of Sin signal 202 power to error signal 219 power, and measures the amount of loss introduced by adaptive filter 220 alone. Control logic 225 detects the infinite ERL if ERLE or the running mean attenuation is less than an ERLE threshold for the infinite ERL, i.e. ERLE<$TH_{infinite}$. In one embodiment, $TH_{infinite}$ is a function of ENR, where $TH_{infinite}$ is higher for cleaner environment and $TH_{infinite}$ is lower for noisier environment, such that lower ERLE is required for detecting the infinite ERL under noisy near-end environment. In one embodiment of the present invention, $TH_{infinite}$ is set as follows:

ENR<1 dB→$TH_{infinite}$=0.25 dB

ENR>1 dB→$TH_{infinite}$=0.5 dB

ENR>16 dB→$TH_{infinite}$=1 dB

ENR>18 dB→$TH_{infinite}$=2 dB

If control logic 225 detects the infinite ERL, control logic 225 causes switch 231 to move from its default position, which connects the NLP output signal 231 to Sout 233, to connect Sin' signal 217 to Sout signal 233 to bypass adaptive filter 220 and NLP 230 in order to disable echo cancellation. However, adaptive filter 220 and NLP 230 continue to operate by processing the signal for the purpose of detecting the finite ERL, because, as discussed above, an echo path change may occur in the network, such that the infinite ERL is changed to the finite ERL. Accordingly, echo canceller 200 continues to operate in order to determine when there is sufficient would-be-attenuation or would-be-filter-contribution by echo canceller 200. To this end, control logic 225 detects the finite ERL if ERLE or the running mean attenuation is less than ERLE threshold for the finite ERL, i.e. ERLE<$TH_{finite}$. In one embodiment, $TH_{finite}$ is a function of ENR, where $TH_{finite}$ is higher for cleaner environment and $TH_{finite}$ is lower for noisier environment, such that lower ERLE is required for detecting the finite ERL under noisy near-end environment. In one embodiment of the present invention, $TH_{finite}$ is set as follows:

ENR>18 dB→$TH_{finite}$=3 dB

ENR>14 dB→$TH_{finite}$=1.5 dB

Else→$TH_{finite}$=0.5 dB

If control logic 225 detects the finite ERL, control logic 225 causes switch 231 to move to its default position to connect the NLP output signal 231 to Sout 233 in order to enable echo cancellation.

In another embodiment of the present invention, control logic 225 detects the infinite ERL and the finite ERL based on the energy distribution. As discussed above, in SPARSE echo cancellers, the delay is indicative of the location of the echo signal segment or window within the 128 ms echo path delay, and the echo signal energy does not appear all over the 128 ms echo path delay, i.e. it is localized, as shown in FIG. 3A.

Figure 3A:
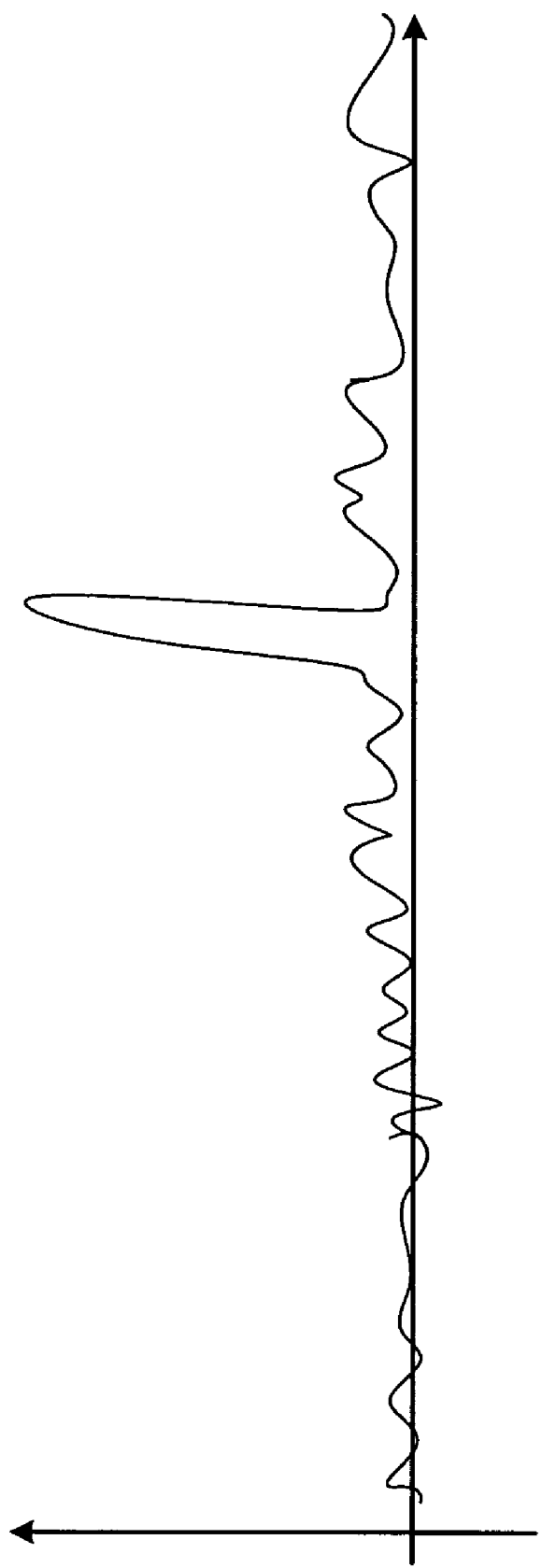
FIG. 3A illustrates a signal diagram of energy distribution for the finite ERL.

In one embodiment of the present invention, control logic 25 monitors the energy distribution within the echo path delay for a predetermined period of time, such as 1-2 seconds, and if control logic 25 determines that the energy is distributed over the entire echo path delay, i.e. not localized, as shown in FIG. 3B, control logic 225 detects the infinite ERL and causes switch 231 to move from its default position, which connects the NLP output signal 231 to Sout 233, to connect Sin' signal 217 to Sout signal 233 to bypass adaptive filter 220 and NLP 230 in order to disable echo cancellation. However, once in the infinite ERL mode, control logic 25 monitors the energy distribution within the echo path delay for a predetermined period of time, such as 25-30 ms, and if control logic 25 determines that the energy is not distributed, as shown in FIG. 3A, control logic 225 detects the finite ERL, and causes switch 231 to move to its default position to connect the NLP output signal 231 to Sout 233 in order to enable echo cancellation.

In a further embodiment of the present invention, control logic 225 detects the infinite ERL and the finite ERL based on a combination of the energy distribution and ENR. In another embodiment, $TH_{infinite}$ and $TH_{finite}$ may be defined as a function of both the energy distribution and ENR.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of switching between an infinite echo return loss (ERL) mode and a finite ERL mode in an echo cancellation system, said method comprising:
   determining a first echo return loss enhancement (ERLE) while said echo cancellation system is in said finite ERL mode;
   determining a first ratio of a first echo signal to a first near-end noise (first ENR) while said echo cancellation system is in said finite ERL mode;
   defining an infinite ERL threshold ($TH_{infinite}$) as a function of said first ENR;
   switching to said infinite ERL mode as a function of said first ERLE and said $TH_{infinite}$;
   determining a second ERLE while said echo cancellation system is in said infinite ERL mode;
   determining a second ratio of a second echo signal to a second near-end noise (second ENR) while said echo cancellation system is in said infinite ERL mode;
   defining a finite ERL threshold ($TH_{finite}$) as a function of said second ENR; and
   switching to said finite ERL mode as a function of said second ERLE and said $TH_{finite}$.

2. The method of claim 1, wherein the higher said first ENR the higher said $TH_{infinite}$ and the lower said first ENR the lower said $TH_{infinite}$.

3. The method of claim 1, wherein said switching to said infinite ERL mode occurs if said first ERLE is less than said $TH_{infinite}$.

4. The method of claim 1, wherein said switching to said infinite ERL mode includes disabling echo cancellation by said echo cancellation system.

5. The method of claim 4, wherein said disabling echo cancellation includes bypassing an adaptive filter and a non-linear processor (NLP) of said echo cancellation system.

6. The method of claim 1, wherein said switching to said infinite ERL mode is further a function of an energy distribution.

7. The method of claim 6, wherein said switching to said infinite ERL mode switches to said infinite ERL mode based on a non-localized energy distribution over an echo path delay for a predetermined period of time.

8. The method of claim 1, wherein said switching to said finite ERL mode is further a function of an energy distribution.

9. An echo cancellation system capable of switching between an infinite echo return loss (ERL) mode and a finite ERL mode, said echo cancellation system comprising:
   a control logic configured to:
      determine a first echo return loss enhancement (ERLE) while said echo cancellation system is in said finite ERL mode;
      determine a first ratio of a first echo signal to a first near-end noise (first ENR) while said echo cancellation system is in said finite ERL mode;
      define an infinite ERL threshold ($TH_{infinite}$) as a function of said first ENR;
      switch to said infinite ERL mode as a function of said first ERLE and said $TH_{infinite}$;
      determine a second ERLE while said echo cancellation system is in said infinite ERL mode;
      determine a second ratio of a second echo signal to a second near-end noise (second ENR) while said echo cancellation system is in said infinite ERL mode;
      define a finite ERL threshold ($TH_{finite}$) as a function of said second ENR; and
      switch to said finite ERL mode as a function of said second ERLE and said $TH_{finite}$.

10. The echo cancellation system of claim 9, wherein the higher said first ENR the higher said $TH_{infinite}$ and the lower said first ENR the lower said $TH_{infinite}$.

11. The echo cancellation system of claim 9, wherein said control logic is configured to switch said echo cancellation system to said infinite ERL mode if said ERLE is less than said $TH_{infinite}$.

12. The echo cancellation system of claim 9, wherein said infinite ERL mode includes disabling echo cancellation by said echo cancellation system.

13. The echo cancellation system of claim 12, wherein said disabling echo cancellation includes bypassing an adaptive filter and a non-linear processor (NLP) of said echo cancellation system.

14. The echo cancellation system of claim 9, wherein said control logic is configured to switch said echo cancellation system to said infinite ERL mode as a function of an energy distribution.

15. The echo cancellation system of claim 14, wherein said control logic is configured to switch said echo cancellation system to said infinite ERL mode based on a non-localized energy distribution over an echo path delay for a predetermined period of time.

16. The echo cancellation system of claim 9, wherein said control logic is configured to switch said echo cancellation system to switch to said finite ERL mode as a function of an energy distribution.

* * * * *